(12) United States Patent
Janning et al.

(10) Patent No.: US 9,553,523 B2
(45) Date of Patent: Jan. 24, 2017

(54) CIRCUIT FOR CONVERTING POWER BETWEEN A THREE-PHASE GRID AND A SINGLE-PHASE GRID

(75) Inventors: Joerg Janning, Berlin (DE); Axel Brandt, Henningsdorf (DE)

(73) Assignee: GE Energy Power Conversion Technology Limited (GB)

( * ) Notice: Subject to any disclaimer, the term of this patent is extended or adjusted under 35 U.S.C. 154(b) by 5 days.

(21) Appl. No.: 13/276,373

(22) Filed: Oct. 19, 2011

(65) Prior Publication Data

US 2012/0106223 A1    May 3, 2012

(30) Foreign Application Priority Data

Oct. 29, 2010    (DE) .......................... 10 2010 043 176

(51) Int. Cl.
| | |
|---|---|
| *H02M 5/45* | (2006.01) |
| *H02M 5/458* | (2006.01) |
| *H02M 1/00* | (2006.01) |
| *H02M 7/487* | (2007.01) |

(52) U.S. Cl.
CPC ........... *H02M 5/4585* (2013.01); *H02M 7/487* (2013.01); *H02M 2001/0077* (2013.01)

(58) Field of Classification Search
CPC ...... H02M 5/4585; H02M 5/458; H02M 7/08; H02M 7/493; H02M 7/1623
USPC .. 363/34, 36, 37, 65, 67, 71, 129, 148, 153; 307/82
See application file for complete search history.

(56) References Cited

U.S. PATENT DOCUMENTS

| | | | | |
|---|---|---|---|---|
| 5,388,031 | A | * | 2/1995 | Satoh .................... B23K 11/241 219/130.1 |
| 5,933,335 | A | * | 8/1999 | Hitchcock et al. ............. 363/25 |
| 6,052,293 | A | * | 4/2000 | Ivner ...................... H02M 5/458 363/36 |
| 6,741,482 | B2 | * | 5/2004 | Yamamoto et al. ............ 363/37 |
| 7,881,078 | B2 | * | 2/2011 | Pereira ...................... H02J 3/36 363/127 |
| 2008/0055947 | A1 | * | 3/2008 | Wen et al. ........................ 363/65 |
| 2008/0205093 | A1 | * | 8/2008 | Davies et al. .................. 363/35 |
| 2008/0304300 | A1 | * | 12/2008 | Raju et al. ..................... 363/126 |
| 2009/0080225 | A1 | * | 3/2009 | Dijkhuizen ..................... 363/65 |
| 2009/0196078 | A1 | * | 8/2009 | Gruber et al. .................. 363/36 |

(Continued)

FOREIGN PATENT DOCUMENTS

DE    94 08 504    11/1995

OTHER PUBLICATIONS

Villanueva et al., Control of a Single-Phase Cascaded H-Bridge Multilevel Inverter for Grid-Connected Photovoltaic Systems, 2009, IEEE Transactions on Industrial Electronics, vol. 56, Issue 11, pp. 4399-4406.*

(Continued)

*Primary Examiner* — Adolf Berhane
*Assistant Examiner* — Alex Torres-Rivera
(74) *Attorney, Agent, or Firm* — Wood IP LLC

(57) ABSTRACT

Described is a circuit for converting electric power between a three-phase grid and a single-phase grid. The circuit includes, in at least one embodiment, a first transformer that is connected to the three-phase grid, a number of first converter stages assigned to the first transformer, the associated DC intermediate circuits and the associated second converter stages. The second converter stages are connected to each other at the alternating-current side outputs with the aid of a series connection.

19 Claims, 3 Drawing Sheets

(56) References Cited

U.S. PATENT DOCUMENTS

2010/0133901 A1* 6/2010 Zhang .................. H02M 5/458
                                                                    307/11

OTHER PUBLICATIONS

Axel Brandt et al., New Traction Power Converter for the DB [German Railways] in Lehrte and Aschaffenburg [Neue Bahnstromumrichter fur die DB Lehrte and Aschaffenburg], Elektrische Bahnen, Journals Apr.+May 2009, (English Translation).*

Ranneberg, J., "Transformerless Topologies for Future Stationary AC-Railway Power Supply," Power Electronics and Applications, pp. 1-11, 2007.

German Office Action mailed Mar. 5, 2013.

"Neue Bahnstromumrichter Fuer Die DB in Lehrte und Aschaffenburg," Elektrische Bahnen, Journals Apr.+May 2009.

* cited by examiner

CIRCUIT FOR CONVERTING POWER BETWEEN A THREE-PHASE GRID AND A SINGLE-PHASE GRID

PRIORITY STATEMENT

The present application hereby claims priority under 35 U.S.C. §119 on German patent application number DE 10 2010 043 176.1 filed Oct. 29, 2010, the entire contents of which are hereby incorporated herein by reference.

FIELD

At least one embodiment of the invention generally relates to a circuit for converting power between a three-phase grid and a single-phase grid.

BACKGROUND

FIG. 1 illustrates the general layout of a circuit, showing a three-phase grid 11 that is connected via a transformer 12 to a converter 13 to which, in turn, a single-phase grid 15 is connected via an additional transformer 14. The converter 13 is configured with converter stages 16, 17 to which a direct voltage (DC) intermediate circuit 18 as well as an absorption circuit 19 are connected. The absorption circuit 19 is normally adapted to twice the nominal frequency of the single-phase grid 15 and can therefore absorb the pulsing power output of the single-phase grid 15. If this absorption circuit 19 is omitted, the DC intermediate circuit 18 must absorb the pulsing power output and must have a corresponding layout.

One embodiment of such a circuit is described in the publication "NEUE BAHNSTROMUMRICHTER FUER DIE DB IN LEHRTE UND ASCHAFFENBURG" (New Traction Current Converters for the German Railroad (DB) in the cities of Lehrte and Aschaffenburg), published in: Elektrische Bahnen, Journals 4+5/2009. The three-phase grid described therein is the public power grid with 50 Hz, 110 kV and the single-phase grid is the railroad grid with 16.7 Hz and 110 kV. In that case, the absorption circuit has a frequency of 33.4 Hz. Four converter stages are provided on the railroad side, which respectively are connected to one winding of the associated railroad transformer. As a result, the output voltages of the converter stages are summed up in the railroad transformer.

SUMMARY

In at least one embodiment of the present invention, a circuit is disclosed which requires less expenditure, in particular on the side of the single-phase grid.

According to at least one embodiment of the invention, the three-phase grid is provided with a first transformer to which are assigned a number of first converter stages, as well as associated DC intermediate circuits and associated second converter stages. The second converter stages are connected to each other at the alternating current outputs with the aid of a series connection.

As a result of the series connection of the second converter stages, the circuit on the side of the single-phase grid can have a very simple layout. The series connection can advantageously be connected to a second transformer or a linear choke that is assigned to the single-phase grid. The expenditure and the costs in particular for the second transformer are thus considerably lower than would be the case according to the prior art.

It is not necessary in that case that the alternating-current side outputs of all second converter stages are connected to each other via the aforementioned series connection. Instead, it is sufficient to combine only a number of these alternating-current side outputs via the series connection, wherein this number can depend, if applicable, on a higher number of the existing second converter stages that may be provided and/or on the number of windings of the second transformer which is assigned to the single-phase grid, or the like.

According to one advantageous embodiment of the invention, several first transformers are provided, wherein a corresponding number of several first converter stages, direct voltage intermediate circuits, and second converter stages are also provided and several corresponding series connections are formed as well. Each of the series connections in that case is preferably connected to one winding of the second transformer, thereby also keeping the expenditure and the costs low.

A further modification of the invention provides for three first transformers, wherein the three series connections which are formed are preferably connected to respectively one of the three windings of the second transformer. The layout of the first transformer can be improved in this way.

According to a different advantageous embodiments of the invention, the first converter stages are each provided with three and the second converter stages are respectively provided with two phase modules, wherein these are advantageously embodied as 3-level-NPC converters (NPC=neutral point clamped).

BRIEF DESCRIPTION OF THE DRAWINGS

Additional features, options for use and advantages of the invention follow from the description, provided below, of example embodiments of the invention which are shown in the Figures of the drawings. All described or shown features by themselves or in any optional combination represent the subject matter of the invention, independent of how they are combined in the patent claims or the references back, as well as independent of how they are formulated and/or shown in the description and/or the drawing.

As previously described.

DETAILED DESCRIPTION OF THE EXAMPLE EMBODIMENTS

Figure 1:
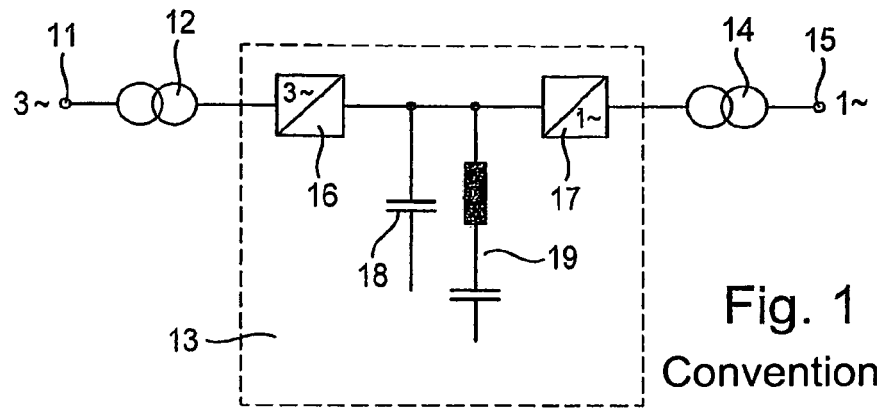
FIG. 1 shows a general layout of a circuit for converting power between a three-phase grid and a single-phase grid.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these tennis. These terms are used only to distinguish one element, component, region, layer, or section from another region, layer, or section. Thus, a first element, component, region, layer, or section discussed below could be termed a second element, component, region, layer, or section without departing from the teachings of the present invention.

Figure 2B:
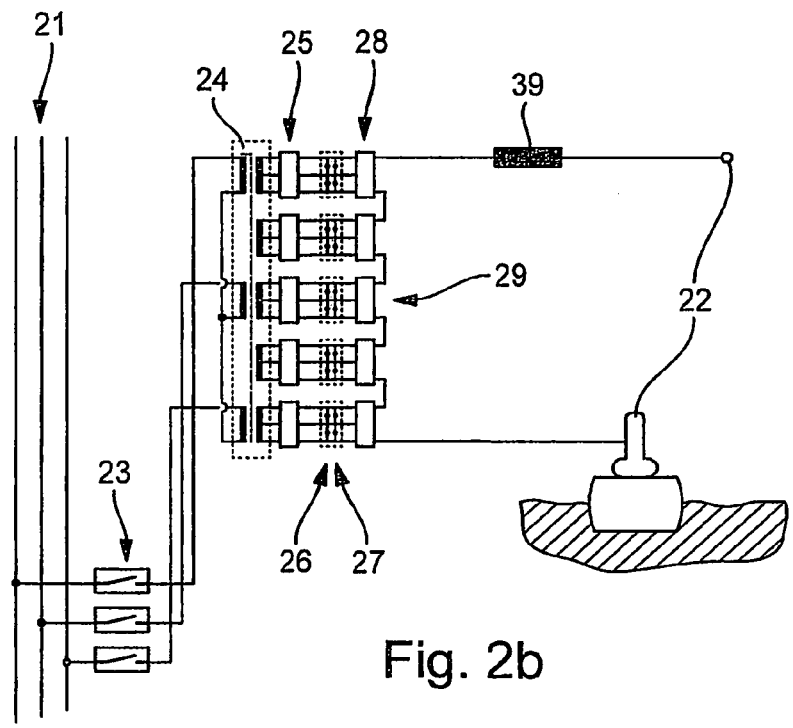
FIGS. 2a and 2b contain two example embodiments of circuits according to the invention for converting power between a three-phase grid and a single-phase grid.
Figure 2A:
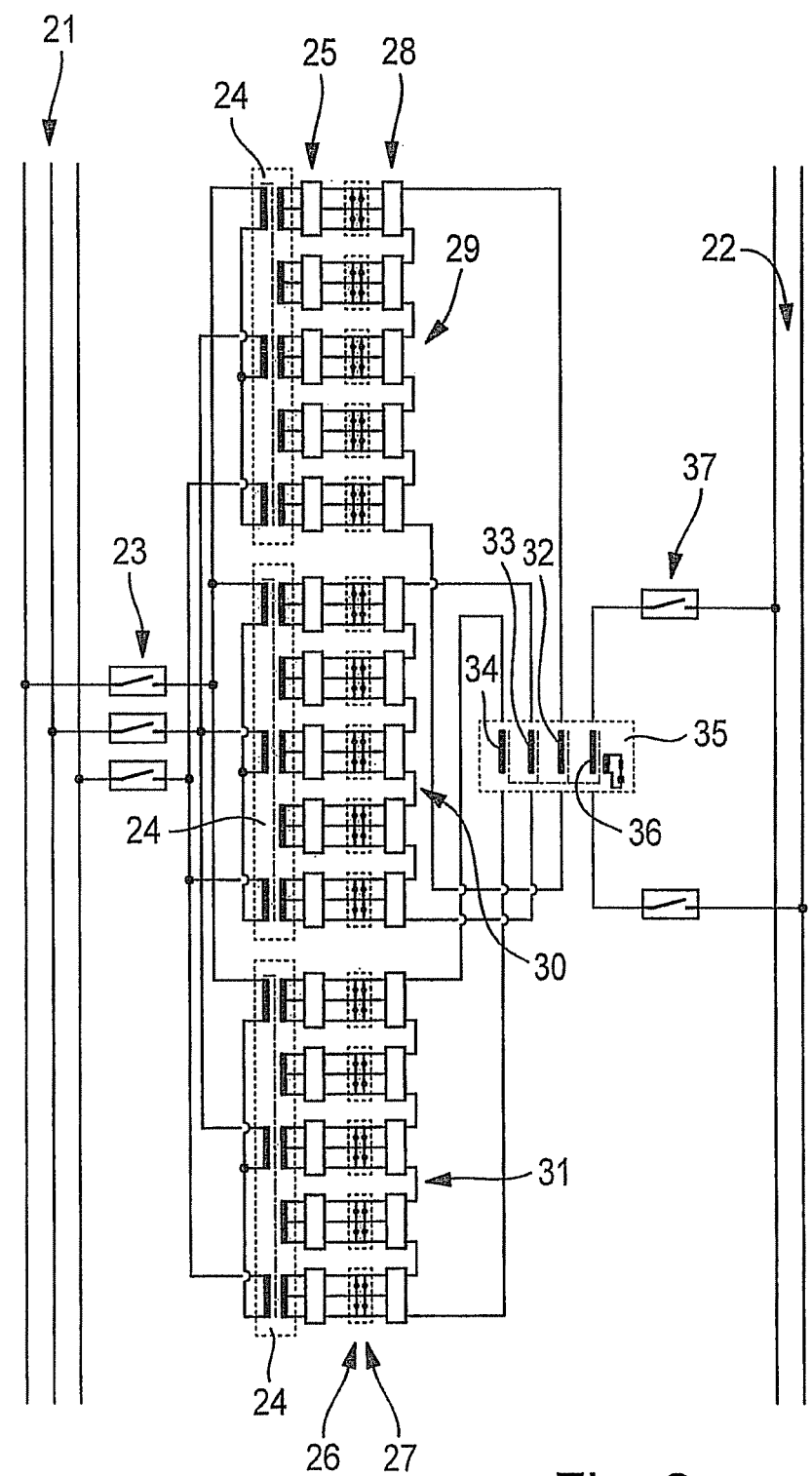

FIG. 2a shows a circuit which is provided on the left side with a three-phase grid 21, for example the three-phase public power grid with 50 Hz, 110 kV and on the right side with a single-phase grid 22, for example the single-phase railroad grid with 16.7 Hz and 110 kV.

Each phase of the three-phase grid 21 is connected via a switch 23 to respectively one winding on the primary side of three first transformers 24. The three windings on the primary side of each first transformer 24 in this case are connected star-shaped. On the secondary side, each of the three first transformers 24 is provided with five windings by means of which each first transformer 24 is connected to five first converter stages 25. On the whole, fifteen first converter stages 25 are thus assigned to the secondary sides of the three first transformers 24.

It is understood that the number of windings on the secondary side and the associated first converter stages 25 can also be more or fewer than five for each first transformer 24, wherein the total number of existing first converter stages 25 can also change correspondingly.

It is furthermore understood that a different number of transformers can also be provided in place of the three first transformers 24.

The three first transformers can furthermore also be embodied differently with respect to the switching technology. The windings of the first transformers 24 can thus be configured and wired differently, for example embodied as a delta circuit or the like.

Each of the first converter stages 25 is connected via a DC intermediate circuit 26 and an absorption circuit 27 with an associated second converter stage 28. A total of fifteen second converter stages 28 thus exist, wherein respectively five of the second converter stages 28 are always combined, insofar as they are assigned to a joint first transformer 24.

For the present example embodiment, the outputs on the alternating current side for respectively five second converter stages 28 which belong together are connected in series, thereby resulting in three series connections 29, 30, 31 of respectively five second converter stages 28.

Each of the three series connections 29, 30, 31 is connected to a secondary winding 32, 33, 34 of a second transformer 35. On the primary side of the second transformer 35, a single winding 36 exists which is connected via the switches 37 to a single-phase grid 22.

It should be pointed out that the series connections 29, 30, 31 can also be configured differently. It is possible, for example, to have only a total of twelve second converter stages 28 and only two windings of the second transformer 35 and that a first series connection on the side of the alternating-current outputs is formed with the first six of the second converter stages 28 and that a second series connection is formed with the second six converter stages 28. In that case, the series connections no longer have a direct reference to the related first and/or second converter stages 25, 28. Instead, the series connections are configured to extend across the "boundaries" set by the first and/or second converter stages 25, 28.

The circuit illustrated in FIG. 2b at least in part coincides with the circuit shown in FIG. 2a. The components of the circuit in FIG. 2b are therefore provided in part with the same references as those in FIG. 2a. Insofar, we point to the associated explanations for FIG. 2a.

The circuit according to FIG. 2b comprises only a single first transformer 24 to which the first converter stages 25, the DC intermediate circuit 26, the absorption circuit 27 and the second converter stages 28 are connected, wherein the number of first and/or second converter stages 25, 28 can also be higher or lower than five. The outputs on the alternating current side of the second converter stages 28 form the series connection 29.

The still unused output of the first one (in FIG. 2b: the upper one) of the second converter stages 28 is connected via a linear choke 39 to the single-phase grid 22, in particular to an overhead line or wire for the railroad grid. The still unused output of the last one (in FIG. 2b: the lowest) of the second converter stages 28 is also connected to the single-phase grid 22, especially the grounded rails of the railroad grid.

It should be pointed out that instead of one linear choke 39, linear chokes with less capacity which together result in the same value as the linear choke 39 can respectively be connected in-between in the series connection 29, meaning in particular between the respectively interconnected alternating current outputs. It is understood that a combination thereof is possible as well.

It is furthermore possible to provide one or more filter circuits in addition to the linear choke or chokes.

In contrast to FIG. 2a, no second transformer 35 is provided for the circuit shown in FIG. 2b. Instead, the series connection 29 of the second converter stages 28 is connected via the linear choke 39 directly to the single-phase grid 22, in particular to the overhead line or wire and the rails of the railroad grid.

Figure 3:
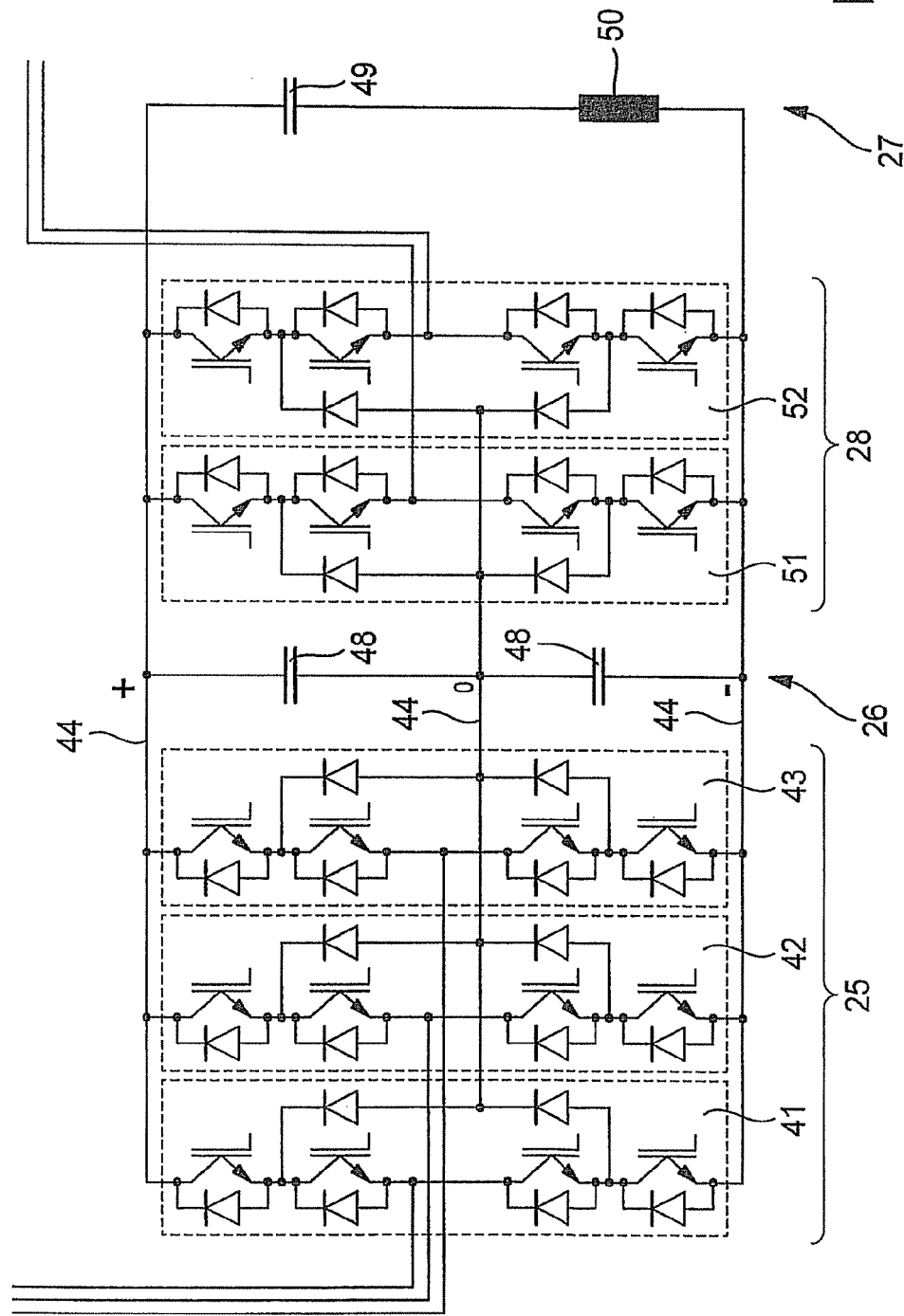
FIG. 3 shows an example embodiment of an inventive circuit for the converters illustrated in FIGS. 2a and 2b.

FIG. 3 shows the layout of each individual converter stage 25 together with the associated DC intermediate circuit 26 and the absorption circuit 27 as well as the associated second converter stage 28.

In FIG. 3, the first converter stage 25 comprises three phase modules 41, 42, 43 which are connected on the alternating current side with the associated secondary windings of the first transformer 24. Each of the three phase modules 41, 42, 43 is embodied as a 3-level-NPC-converter (NPC=neutral point clamped). The layout of the phase modules 41, 42, 43 corresponds to the standard layout for these 3-level NPC converters.

Different converters can alternatively also be used in place of the 3-level-NPC converters shown for the exemplary embodiment, for example 2-level converters or differently designed DC intermediate circuit converters. A further option is that for the purpose of increasing the output current, if applicable, the phase modules can be modules that are connected parallel via output chokes.

The first converter stage 25 is provided on the direct current side with three terminal points for three direct current levels. The terminal points according to FIG. 3 take the form of direct-current rails 44. The direct current rails 44 in this case have a positive direct current level "+," a neutral direct current level "0" and a negative direct current level "−."

The DC intermediate circuit 26 is realized with the aid of two capacitors 48, shown as exemplary embodiments. It is understood that the DC intermediate circuit 26 can also comprise a plurality of capacitors 48. The capacitors 48 are arranged between the positive and the negative direct current level on the one hand and the neutral and the negative direct current level on the other hand.

If applicable, the DC intermediate circuit 26 can additionally comprise one or several filter circuits which are intended for absorbing the grid harmonics.

The absorption circuit 27 is realized with a series connection consisting of a capacitor 49 and a coil 50, wherein this series connection is connected between the positive and the negative direct current level. The absorption circuit 27 functions to compensate for the pulsing power output of the single-phase grid 22, in particular the railroad grid. The absorption circuit 27 represents a form of the DC intermediate circuit 26 and can also be omitted, provided the capacitors are dimensioned with sufficient capacity.

The second converter stage 28 comprises two phase modules 51, 52 which are respectively 3-level-NPC converters (NPC=neutral point clamped). The layout of the phase modules 51, 52 corresponds to the standard layout for such a 3-level-NPC converter. However, different circuits can also be used in place of the 3-level-NPC converters.

On the direct current side, the two phase modules 51, 52 are connected to the direct current rails 44. On the alternating current side, the two phase modules 51, 52 are connected to the associated series connection 29, 30, 31.

The voltage of the three-phase power grid 21 is applied on the primary side of each of the three transformers 24. On the secondary side, a transformed voltage is obtained for each of the three first transformers 24 and this voltage is then transmitted to the five respectively associated first converter stages 25.

Each of these five first converter stages 25 acts upon the direct current rails 44 and thus the associated second converter stages 28. Each of the second converter stages 28 generates a total of five direct current levels with the aid of the respectively connected, two phase modules 51, 52 which are configured in bridge mode. The direct current levels of the individual converter stages 28 are different in that case.

A total of twenty-one direct current levels consequently result based on the series connections 29, 30, 31 of the second converter stages 28. At each of the series connections 29, 30, 31, an output voltage, which is for the most part discretionary, can thus be generated with the aid of the aforementioned direct current levels, if applicable also a direct current.

For the example embodiment shown in FIG. 2a, a single-phase voltage can be generated with the aid of the twenty-one direct current levels and can then be transmitted via the respectively associated windings 32, 33, 34 of the second transformer 35 to the single-phase grid 22.

For the embodiment shown in FIG. 2b, a desired single-phase voltage can also be generated with the aforementioned direct current levels and can be fed directly into the single-phase grid 22.

In reverse direction, the single-phase alternating current of the single-phase grid 22 is transformed by the second transformer 35 and is converted by respectively five connected second converter stages 28. The alternating current of the three-phase power grid 21 is generated from this with the aid of the associated first converter stages 25 and the respective first transformers 24.

In addition, we want to point out that the second transformer 35 in FIG. 2b on the primary side can also be realized with three windings, wherein a three-phase grid can then be connected to these three windings. In that case, the above described circuit functions to convert electric power between a first three-phase grid, for example a delta grid with 110 kV and 50 Hz, and a second three-phase grid, for example a delta grid also with 110 kV, but with 16.7 Hz.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A circuit for converting electric power between a three-phase grid and single-phase grid, comprising:
    a plurality of first transformers, each of the plurality of first transformers having a primary side and a secondary side, the primary side and the secondary side each having a number of windings, and being connected to the three-phase grid;
    a plurality of first converter stages connected to the plurality of first transformers wherein a number of plurality of first converter stages corresponds to the number of the windings on the secondary side;
    a plurality of DC intermediate circuits connected to the plurality of first converter stages; and
    a plurality of second converter stages connected to the plurality of first converter stages;
    a plurality of series connections including a number of the plurality of second converter stages connected in series with one another at alternating-current outputs of the plurality of second converter stages; and
    wherein each series connection of the plurality of series connections is respectively connected with a separate input of the plurality of DC intermediate circuits and the plurality of series connections together form a three-phase configuration to be connected to the single-phase grid.

2. The circuit according to claim 1, wherein the plurality of DC intermediate circuits comprises:
    a second transformer assigned to the plurality of second converter stages and connected to the single-phase grid, wherein the second converter stages are connected via the plurality of series connections to the second transformer.

3. The circuit according to claim 2, wherein each series connection of the plurality of series connections is connected to a winding of the second transformer.

4. The circuit according to claim 2, wherein each series connection of the plurality of series connections is connected to a separate winding of the second transformer.

5. The circuit according to claim 4, wherein the plurality of first transformers includes three first transformers.

6. The circuit according to claim 5, wherein, the second transformer comprises three windings and the plurality of series connections comprises three series connections, wherein each series connection of the three series connections is connected to a winding of the three windings, respectively.

7. The circuit according to claim 2, wherein the plurality of first transformers includes three first transformers.

8. The circuit according to claim 7, wherein, the second transformer comprises three windings and the plurality of series connections comprises three series connections, wherein each series connection of the three series connections is connected to a winding of the three windings, respectively.

9. The circuit according to claim 1, wherein the plurality of DC intermediate circuits each comprise a linear choke, and each series connection of the plurality of series connections is connected via the linear choke to the single-phase grid.

10. The circuit according to claim 9, wherein the plurality of series connections are connected to an overhead wire or line for a railroad grid.

11. The circuit according to claim 1, wherein the plurality of first converter stages includes at least five first converter stages, wherein the plurality of DC intermediate circuits includes at least five DC intermediate circuits and the plurality of second converter stages includes at least five second converter stages.

12. The circuit according to claim 1, wherein each of the plurality of first converter stages includes three phase modules.

13. The circuit according to claim 12, wherein the three phase modules are embodied as 3-level-neutral point clamped (NPC) converters.

14. The circuit according to claim 1, wherein each of the plurality of second converter stages includes two phase modules.

15. The circuit according to claim 14, wherein the two phase modules are connected in parallel.

16. The circuit according to claim 14, wherein the two phase modules are embodied as 3-level-neutral point clamped (NPC) converters.

17. The circuit according to claim 16, wherein the two phase modules are connected in parallel.

18. The circuit according to claim 1, further comprising:
an absorption circuit including a capacitor and a coil.

19. A circuit for converting electric power between a three-phase grid and single-phase grid, comprising:
- a plurality of first transformers, each first transformer having a primary side and a secondary side, the primary side and the secondary side each having a number of windings, and being connected to the three-phase grid;
- a plurality of first converter stages connected to the plurality of first transformers wherein a number of plurality of first converter stages corresponds to the number of the windings on the secondary side;
- a plurality of DC intermediate circuits connected to the plurality of first converter stages; and
- a plurality of second converter stages connected to the plurality of first converter stages; wherein a number of the plurality of second converter stages are connected in series with one another by forming a a plurality of series connections at alternating-current outputs of the plurality of second converter stages; and
- at least one second transformer, wherein each of the plurality of series connections together form a three-phase configuration connected to the second transformer, and the second transformer is connected to the single-phase grid.

* * * * *